Dec. 20, 1966  R. CALVERT ETAL  3,293,546
SELF-BALANCING IMPEDANCE MEASURING BRIDGE
Filed June 12, 1963  3 Sheets-Sheet 1

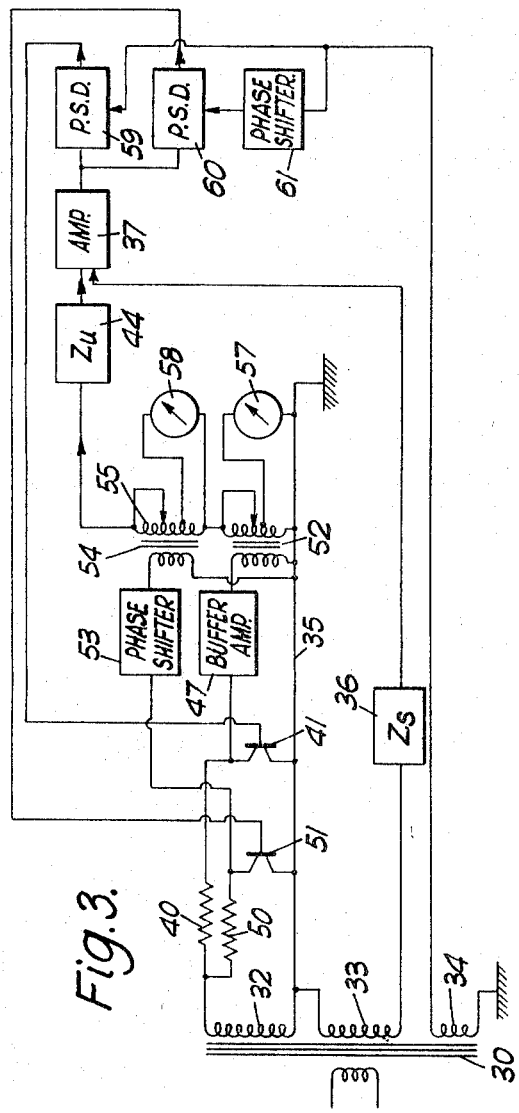

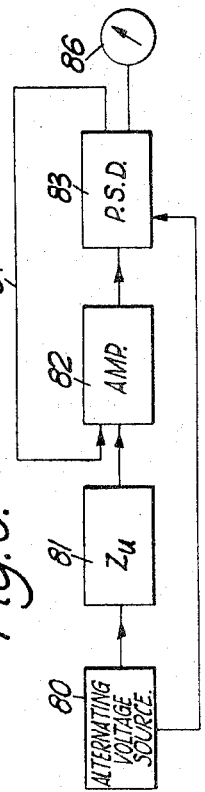

United States Patent Office 3,293,546
Patented Dec. 20, 1966

3,293,546
SELF-BALANCING IMPEDANCE MEASURING BRIDGE
Raymond Calvert and John Mildwater, Chessington, England, assignors to The Wayne Kerr Laboratories Limited, Surrey, England, a British company
Filed June 12, 1963, Ser. No. 287,404
Claims priority, application Great Britain, June 13, 1962, 22,788/62
15 Claims. (Cl. 324—57)

This invention relates to electrical bridges for measuring or responsive to impedances.

If a bridge is to measure a high impedance the correct method to employ is to apply a voltage to the impedance and to balance the current flowing through the impedance. On the other hand if the bridge is to measure a low impedance a known current should be passed through the impedance and the voltage developed across the unknown impedance measured by balancing this voltage. These statements are best explained by considering what happens if the converse is attempted. If an attempt is made to pass a known fixed current through a high impedance it is difficult to ensure that the current from the source wholly flows through the unknown impedance. Since the impedance is high, part of the current may well be diverted into other unknown and ill-defined shunt paths and not flow through the unknown impedance as required. Even if it could be ensured that all the current passed through the unknown impedance, it is even more difficult to ensure that the current is constant since this would require a source output impedance of such a high order that the unknown impedance does not affect the magnitude of the current. Thus it is clearly very difficult to pass a known current through a high impedance whereas it is much easier to apply a known voltage to a high impedance since the source impedance, by definition, will be low compared with the unknown impedance. Any currents which flow from the voltage source through any other known or unknown paths in shunt across the unknown impedance are unimportant since they are not included in the measured current through the unknown impedance provided these currents do not offset the source voltage. Similarly in attempting to measure a low impedance, it is difficult to apply a voltage to a low impedance which is unaffected by the loading of the unknown impedance whereas it is much simpler to provide a constant current flowing through the unknown low impedance. It is also easier to measure the voltage developed across this unknown impedance, excluding any voltage developed in unwanted impedances in series with the unknown, but difficult to exclude unwanted series elements in the converse arrangement.

It will be seen therefore that, to measure a high impedance, a voltage is applied to the impedance and the current flowing through it is measured. This current is directly proportional to the admittance and inversely proportional to the impedance. For this reason, self-balancing bridges for measuring high value impedances having a feedback amplifier for providing a current to balance the unknown current give an output from the amplifier which is proportional to the admittance of the unknown impedance and such bridges heretofore have given a direct reading of admittance rather than impedance. It is one of the objects of the present invention to provide a self-balancing bridge for measuring high impedances which will give a direct reading of impedance. It will be understood that, in referring to high and low impedances, these terms are used in a relative sense with respect to the various stray impedances and other factors affecting the accuracy of measurement. There is no distinct border between them but the arrangement of the present invention might commonly be used for measuring impedances greater and generally very much greater than 1 ohm.

According to this invention, an electrical bridge comprises a voltage source, means for applying a voltage from said source to a standard impedance to provide a reference current, a controllable potential divider for deriving a voltage from said voltage source which can be controlled, means for applying the voltage from the potential divider to the unknown impedance to provide a second current, comparison means for comparing said first and second currents, means for controlling the voltage from said potential divider in accordance with the output of said comparison means so as to tend to bring the two currents to equality and means responsive to the voltage applied to the unknown impedance. It will be seen that with this arrangement the current through the unknown impedance is brought to a known value by the adjustment of the potential divider and the voltage applied to the unknown impedance to produce the known current through that impedance is determined. Hence this form of bridge is particularly suitable for measuring high impedances since the actual current through the unknown impedance is balanced by the reference current from the standard impedance. In the simplest arrangement, for measuring an impedance, indicating means may be arranged to measure directly, e.g., on a meter, the voltage applied to the unknown impedance. The measured voltage is then directly proportional to the unknown impedance and hence this form of bridge measures directly in impedance and not in terms of admittance. In some cases, however, it may be preferred to obtain a more accurate indication by measuring on a meter the difference between this voltage and reference or standard voltage, e.g., the voltage applied to the standard impedance or a known multiple or fraction thereof; by this arrangement the required impedance can readily be determined to more significant figures than is possible by direct reading on a meter.

Although it is convenient to describe the apparatus in the form of an impedance measuring bridge, it will be appreciated that the output voltage need not necessarily be indicated but might be fed to a recorder or used as a control signal. For example, the impedance being measured might be that of a transducer measuring some physical parameter and the output voltage may be used to control this parameter.

It is readily possible by providing suitable switching of the circuit components forming the bridge to switch the bridge so that it can measure in terms of admittance instead of impedance. For admittance measurement the attenuating means may be dispensed with and the bridge arranged in the known manner to balance currents from the unknown and standard impedances, these currents being produced by voltages from the source. For admittance measurement, the out-of-balance current may be amplified in a high gain amplifier with a feedback circuit and the output voltage of the amplifier measured or the feedback current measured so that a direct indication of the out-of-balance signal may be obtained thereby giving a direct reading of the admittance of the unknown impedance.

Reverting to consideration of the impedance measuring bridge, in the case of an alternating current bridge, the voltage source conveniently comprises an oscillator with a voltage transformer having secondary windings to give outputs in a known ratio for feeding to the standard impedance and the attenuator.

The potential divider may comprise an adjustable attenuator. If an alternating voltage source is used, the output of the attenuator may be applied to an adjustably tapped transformer and it will be seen that the use of an attenuator does not necessarily imply that the available output voltage is less than the input. Another arrangement of controllable potential divider which may be preferred for some purposes is an amplifier with an input resistor and having a thermistor in a feedback path and control means for controlling the temperature of the thermistor; by varying the temperature, the ratio between the output voltage and input voltage may be adjusted. This arrangement also enables the output voltage to be greater than the input if required.

If an attenuator is used, conveniently it comprises a bi-directional transistor in series with a fixed resistor. A control signal from said comparison means may be applied to the base of the transistor so varying the resistance of the transistor and thus the proportion of the applied voltage developed across the transistor. The voltage may be applied to the unknown impedance and may be measured by a meter.

In an alternating current energised bridge, the comparison means conveniently comprises a high gain amplifier into the input of which are fed the currents through the standard and unknown impedances in opposition to one another and a phase sensitive detector controlled from said alternating voltage source to produce a direct control voltage from the output of said amplifier.

The output from the potential divider may be applied to an adjustably tapped ratio transformer which feeds the unknown impedance, thereby enabling the range of values which can be measured to be adjusted. In such an arrangement, the indicating means may be arranged to indicate the voltage across a tapped portion or the whole of said adjustably tapped transformer whereby the voltage applied to the unknown impedance may be determined from the setting of the transformer taps and the indication of said indicating means.

The bridge may be arranged for separately determining the two components of a complex impedance; for this purpose the voltage source may be arranged to feed two separate controllable potential dividers, the outputs of which are combined in phase quadrature to feed said unknown impedance and the comparison means may comprise a high gain amplifier into the input of which are fed the currents through the standard and unknown impedances and two separate phase sensitive detectors controlled in phase quadrature to detect two components of the output from the amplifier for controlling the appropriate potential dividers. The outputs of the two potential dividers are conveniently combined by applying them, with a relative phase shift of 90°, to the primary windings of two transformers having secondary windings connected in series with one another and the unknown impedance. These secondary windings may be adjustably tapped so that the effective numbers of turns of the two windings in the series circuit may be adjusted. In such an arrangement for determining the two components of a complex impedance, the indicating means may comprise two separate indicators coupled respectively to the aforementioned secondary windings of the two transformers or to further separate windings for separately indicating the two components of the voltage applied to the unknown impedance or voltages in known ratio to these two components.

In the following description of a number of embodiments of the invention reference will be made to the accompanying drawings in which:

FIGURE 1 is a block diagram illustrating the general principles of a direct-reading self-balancing bridge for measuring high impedances;

FIGURE 2 is a circuit diagram illustrating in further detail a direct-reading self-balancing bridge for measuring high impedances;

FIGURES 3 and 4 illustrate modifications of the arrangement of FIGURE 2;

FIGURE 5 illustrates a modification of part of FIGURE 2; and

FIGURE 6 illustrates how the components of the bridge of FIGURE 1 may be re-arranged for reading admittance.

Referring to FIGURE 1 there is illustrated diagrammatically an alternating current electrical bridge circuit comprising a voltage source 10 providing output voltages in known ratio on leads 11, 12. The lead 11 applies the voltage to an adjustable attenuator 13 which attenuates the voltage in accordance with an electrical control signal on a lead 14. The output voltage from the attenuator 13 is measured by means of a phase sensitive voltmeter 15, the phase reference standard being derived in a manner to be described later. The output voltage from the attenuator 13 is applied to the unknown impedance indicated diagrammatically at 16 and the resultant current through this unknown impedance is fed into the input of a high gain amplifier 17. This amplifier has a feedback path arranged to provide a feedback current into the input of the amplifier in opposition to the input from the impedance 16. Since the amplifier 17 has a high gain, it will have a net input which is negligible, that is to say the feedback current equals the input currents from the impedance 16, and so the output voltage of the amplifier will be proportional to the input current from the unknown impedance 16, the proportionality factor depending on the magnitude of a standard impedance 18 in the feedback circuit. This voltage is applied to a voltage comparator 19 where it is compared with the reference voltage on the lead 12 from the aforementioned voltage source 10. Any out-of-balance between the two voltages applied to the comparator 19 causes the signal to be developed which is applied via the aforementioned lead 14 to control the attenuator 13 in the sense such as to tend to bring the system into balance. The phase reference for the phase sensitive voltmeter 15 is obtained from the output of the amplifier 17 by a lead 20.

It will be seen that, with this arrangement, the indication on the indicator 15 is a measure of the voltage which has to be applied to the unknown impedance 16 to produce a standard current through that impedance. The bridge is automatically self-balancing and the indicator 15 gives a direct reading of the impedance to be measured.

One embodiment of a self-balancing bridge is illustrated in further detail in FIGURE 2. This bridge has an input transformer 30 with a primary winding 31 energised from a suitable source of alternating current and three secondary windings 32, 33 and 34. The turns ratio of the windings 32, 33 determines the relative voltages $E_1$ and $E_2$ developed in these windings. The windings 32, 33 are connected in series and the junction of the two windings is earthed as indicated at 35. The winding 33 is arranged to apply a voltage $E_1$ to a standard impedance $Z_s$ indicated at 36 so producing a current $i_s$ through this impedance which current is fed into the input of a high gain amplifier 37.

Connected across the winding 32 is an attenuating network comprising a resistor 40 and a bi-directional transistor 41. The resistance of the transistor 41 will depend upon the current fed into its base and thus the resistor 40 and transistor 41 form a potentiometer network providing an attenuated voltage which can be controlled by the current fed to the base of the transistor on a lead 42. The voltage $kE_2$ across the transistor 41 is applied to an auto-transformer 43 having a number of taps one of which can be selected for applying a known proportion of the attenuated voltage $kKE_2$ to the unknown impedance $Z_u$ which is indicated diagrammatically at 44. The resultant current $i_u$ from the unknown impedance is fed into the input of the amplifier 37 in opposition to the current $i_s$ from the standard impedance 36. Thus if these two currents are equal the net input to the amplifier 37 will be zero. The amplifier 37 may conveniently be a high gain negative feedback amplifier in which case the output voltage of the amplifier will be directly proportional to the difference between $i_s$ and $i_u$. The phase of the output from the amplifier 37 will depend on which of these two currents is the greater. The output from the amplifier is applied to a phase sensitive detector 45 and the aforementioned winding 34 is used to provide a phase reference signal for gating the phase sensitive detector 45. This detector will thus provide an output only if one of the input currents to the amplifier 37 exceeds the other. This output is applied to the lead 42 and is arranged to adjust the attenuation provided by the attenuating network so as to bring the system to balance, that is to say so that $i_s$ is equal to $i_u$. The voltage $kE_2$ developed across the transistor 41 is measured by a voltage indicating meter 46. A buffer 47 is provided to prevent the meter 46 and the auto-transformer 43 from loading the attenuating network. The buffer may comprise a unity gain amplifier; since the meter 47 indicates the voltage applied to the transformer 43, the exact gain of the buffer is immaterial.

With the circuit arrangement of FIGURE 2 the current $i_u$ from the unknown impedance into the input of the amplifier 37 will be equal to the ratio between the voltage $kKE_2$ applied to the unknown impedance and the magnitude of the unknown impedance $Z_u$. Similarly the current $i_s$ from the standard impedance 36 into the amplifier 37 will depend on the ratio of the voltage $E_1$ applied to the standard impedance and the magnitude of the standard impedance $Z_s$. Thus $$Z_u = \frac{kKE_2}{E_1} Z_s$$

The ratio of the voltages $kKE_2/E_1$ is determined by the number of turns on the windings 32 and 33 and on the setting of the tap on the auto-transformer 43 and on the attenuation provided by the attenuating network. However the meter 46 reads directly the voltage $kE_2$ applied to the transformer 43 and the setting of the switch on the taps of this transformer 43 thus enables the voltage $kKE_2$ applied to the unknown impedance to be determined directly from the meter reading and the tap setting. It will be seen that the magnitude of the unknown impedance $Z_u$ is directly proportional to the reading on the meter 46 with the proportionality factor readily determinable from the magnitude of the standard impedance and the bridge settings and the unknown impedance is thus measured directly in ohms, that is to say as an impedance and not as an admittance.

It will readily be seen that, by altering the phase of the gate signal from the winding 34 applied to the phase sensitive detector, the bridge may be arranged to measure either the real or the imaginary part of the unknown impedance using a single resistive standard or a single reactive standard. Thus by switch means, both the real and imaginary parts can be measured. Alternatively instead of switching the phase of the reference signal, the standard impedance might be switched between resistive and reactive standards.

FIGURE 3 illustrates a modification of the arrangement of FIGURE 2. In FIGURE 3 the same reference numerals are used as in FIGURE 2 for similar components. In FIGURE 3 there is provided a second separate attenuating network consisting of a resistor 50 and a transistor 51 similar to 40, 41. The voltage across transistor 41 is applied, via the buffer 47 to a transformer 52 whilst the voltage across transistor 51 is applied via a 90° phase shifter 53 to a transformer 54. The outputs on secondary windings 55, 56 of the transformers 52, 54 are added in series and applied to the unknown impedance 44. Separate indicators 57, 58, each of which may comprise a detector feeding a meter, are provided for indicating the output voltages of the two secondary windings 55, 56. The two indicators 57, 58 may be fed from separate ratio windings on the transformers 52, 54 so that each may have one terminal connected to the neutral line 35. Two separate phase sensitive detectors 59, 60 are provided, the phase sensitive detector 60 including a 90° phase shifter 61 in its reference signal input circuit and being arranged to control the transistor 51. Whilst the phase sensitive detector 59 controls the transistor 41.

The two meters 57, 58 thus indicate the real and imaginary parts of the unknown impedances.

Switch means (not shown) may be provided for reversing the phase of the real and/or quadrature inputs to the unknown impedance 44 from the transformers 52, 54, by reversing the connections to the windings, so enabling measurements to be made in all four quadrants of the complex plane.

In some cases it may be desirable to provide a current transformer in the input to the amplifier 37 to provide a ratio between the currents of the standard and unknown impedances and so thereby giving the bridge a greater range of measurements.

FIGURE 4 illustrates another modification of the arrangement of FIGURE 2 and in FIGURE 4 similar reference numerals are used for corresponding components. In the following description mention will only be made of the distinctive features of FIGURE 4. In the arrangement of FIGURE 4 the auto-transformer 43 is replaced by a double wound transformer 75 which has a series of taps on the secondary winding giving output voltages conveniently in steps of multiples of ten over a range typically providing outputs of 1, 10, 100 and 1,000 units and instead of the meter 47 across the input to the transformer 43, a meter 76 is connected across part of the secondary windings of the transformer 75. The secondary winding of the transformer 75 may, as shown in FIGURE 3, be connected in series with the winding 33 for energising the standard impedance 36. The transformer 75 enables the bridge to be used over a greater range of measurement than is possible with the bridge of FIGURE 2.

In each of FIGURES 2 to 4, the meters are arranged to measure the appropriate voltage applied to the unknown impedance. It may often be preferable to arrange the meters to read the difference between the required voltage and a standard voltage, conveniently obtained from a winding on the input transformer 30 so that the major part of the required voltage determination is given by the reference standard and the meter indicates a smaller part, thereby enabling a reading to more significant figures to be obtained.

In FIGURES 2 to 4, the attenuating network or networks each comprise a resistor in series with a transistor. Instead of a transistor with a resistor, any other suitable transducer for converting the feedback signal into a change in impedance may be employed with a suitable fixed impedance element, for example a thermistor in series with a resistor or a voltage-sensitive capacitive diode in series with a capacitor. If a thermistor is employed, it may conveniently be connected in series with a resistor (corresponding to resistor 40 of FIGURE 2) and this series circuit may conveniently be connected across a voltage supply source giving opposite polarity voltages with respect to earth. In this case the feedback from the detector is applied to control the temperature of the thermistor. With this arrangement, much larger changes can be obtained for small changes in the feedback information compared with the use of a bi-directional transistor and it is now readily possible to obtain a true zero input to the buffer amplifier 47. Another way of achieving this result would be to insert a transformer winding between the input to the buffer and the junction of the resistor 40 and transducer element 41. This would ensure a finite signal requirement from the attenuator for zero meter reading, the transformer winding being arranged to subtract from the attenuator output.

The attenuating network constitutes a controllable potential divider and, in another arrangement illustrated in FIGURE 5 such a potential divider comprises a fixed resistor 70 forming an input resistance to a high gain amplifier 71 having a thermistor 72 in a feedback path. By controlling the thermistor heating directly or indirectly, for example by a control signal applied to a heater element 73, the alternating potential across the thermistor 72 relative to the applied input alternating potential can be controlled. This arrangement has the advantage that the potential across the thermistor is not now necessarily less than the input alternating potential.

In the arrangements of FIGURES 2, 3 and 4, to obtain higher accuracy, the transformer 43 may be included in series with a switched decade winding or a plurality of decade windings on the transformer 30. The attenuator and feedback system now only contribute the difference between the unknown and the decade setting or settings. This makes for greater discrimination. This arrangement may be preferable to subtracting at the meter although the latter arrangement may be used in some cases.

Although FIGURES 1 to 4 show impedance measuring bridges for giving a direct indication of an impedance to be measured, it will be appreciated that the output voltage, instead of being applied to an indicator, might be used for other purposes, e.g. as a control voltage in an automatic control system for controlling some parameter in response to the determined impedance.

FIGURE 6 illustrates how the bridge of FIGURE 1 may readily be converted for measuring admittance instead of impedance. Referring to FIGURE 5 there is shown a source of alternating voltage indicated diagrammatically at 80 which applies a fixed voltage to the unknown impedance indicated diagrammatically at 81. The resultant current through the unknown impedance is fed into the input of high gain amplifier 82 and the output of this is fed to a phase sensitive measuring circuit. This measuring circuit includes a phase sensitive detector 83 and the required phase component is fed back by a feedback circuit 84 to the input of the amplifier 82. The phase reference standard for the phase sensitive detector is provided from the source 80 by a lead 85. Because the amplifier 82 has a high gain the net input to the amplifier of the required phase component will be substantially zero and the phase sensitive measuring circuit will give indication, which may be displayed on a meter 86, corresponding to the required phase component of the current from the unknown impedance 81. It will be seen that in this arrangement a standard voltage is applied to the unknown impedance 81 and the current passing therethrough is measured. This arrangement therefore gives a direct indication in terms of admittance rather than impedance, as may be preferred for some purposes. It will be noted that each of the components of the bridge of FIGURE 6 is used in the bridge of FIGURE 1 and thus, by the provision of suitable switches, the bridge of FIGURE 1 may be switched to measure admittance insead of impedance if so desired.

Another way of modifying the bridge of FIGURE 1 to read admittance would be to interchange the unknown impedance 16 and the standard impedance 18 but the arrangement of FIGURE 6 may be preferred since it avoids the use of the attenuator.

The bridges of FIGURES 2 to 4 may also readily be modified to give an indication of the admittance instead of impedance by interchanging the standard impedance 36 and the unknown impedance 44 so that the potential divider 40, 41 or the potential dividers 40, 41 and 50, 51 control the voltage applied to the standard impedance.

We claim:

1. An electrical bridge to give an output in accordance with the magnitude of an unknown impedance comprising a voltage source, a standard impedance, means for applying a voltage from said source to said standard impedance to provide a first current constituting a reference, a voltage-controllable resistance, a fixed resistor connected in series with said voltage-controllable resistance to form a potential divider, means for applying a voltage from said source across said potential divider, means for applying the voltage between one end of the potential divider and the junction of the voltage-controllable resistance and fixed resistor to the unknown impedance to provide a second current, comparison means for comparing said first and second currents to produce a control signal dependent on the difference of the two currents, circuit means for applying said control signal to said voltage-controllable resistance to control the voltage from said potential divider in the sense to tend to bring the two currents to equality, and output means responsive to the voltage applied to the unknown impedance.

2. An electrical bridge as claimed in claim 1 wherein said means responsive to the voltage applied to the unknown impedance comprises a meter arranged to measure directly the voltage applied to the unknown impedance.

3. An electrical bridge as claimed in claim 1 wherein said means responsive to the voltage applied to the unknown impedance comprises a reference voltage source and an indicator indicating the difference between the voltage applied to the unknown impedance and the voltage from said reference voltage source.

4. An electrical bridge as claimed in claim 1 wherein the voltage source is an oscillator with a voltage transformer having secondary windings to give outputs in known ratio for feeding to the standard impedance and the controllable potential divider.

5. An electrical bridge as claimed in claim 4 wherein the controllable potential divider comprises a fixed impedance in series with a voltage-controlled adjustable impedance to form a controllable attenuator in shunt across one of said secondary windings.

6. An electrical bridge to give an output in accordance with the magnitude of an unknown impedance comprising a voltage source, a standard impedance, means for applying a voltage from said source to said standard impedance to provide a first current constituting a reference current, a bi-directional transistor having a base, emitter and collector, a fixed resistor connected in series with the collector-to-emitter circuit of said transistor to form a potential divider, means for applying a voltage from said source to the series circuit comprising the fixed resistor and the transistor, means for applying the voltage between one end of the potential divider circuit and the junction of the transistor and fixed resistor to the unknown impedance to provide a second current, comparison means for comparing said first and second currents to produce a control signal dependent on the difference of the two currents, circuit means for applying said control signal to the base of said transistor to control the voltage from said potential divider in the sense to tend to bring the two currents to equality, and output means responsive to the voltage applied to the unknown impedance.

7. An electrical bridge to give an output in accordance with the magnitude of an unknown impedance comprising a ratio transformer having a primary winding and two closely coupled secondary windings, an alternating voltage source coupled to said primary winding, a standard impedance fed from one of said secondary windings to provide a first current constituting a reference current, a bi-directional transistor having a base, emitter and collector, a fixed resistor connected in series with the collector-to-emitter circuit of said transistor so that the resistor and transistor constitute two elements of a potential divider, means coupling the other of said secondary windings to said series circuit comprising the fixed resistor and the transistor, means for applying the voltage developed across one element of said potential divider to the unknown impedance to provide a second current, comparison means arranged to compare the magnitudes of the first and second currents and to provide a direct voltage control signal dependent on the difference of these two currents, circuit means for applying said control signal to the base of said transistor to control the voltage from said potential divider in the sense to tend to bring the two currents to equality, and output means responsive to the voltage applied to the unknown impedance.

8. An electrical bridge as claimed in claim 7 wherein said comparison means comprises a high gain amplifier into the input of which are fed the currents through the standard and unknown impedances in opposition to one another and a phase sensitive detector controlled from said alternating voltage source to produce a direct control voltage from the output of said amplifier.

9. An electrical bridge as claimed in claim 7 wherein said means for applying the voltage across one element of the potential divider to the unknown impedance comprises an adjustably tapped ratio transformer having a secondary winding coupled to feed the unknown impedance, and wherein said output means responsive to the voltage applied to the unknown impedance comprises indicating means connected to said secondary winding to indicate the voltage across at least a portion of the secondary winding of said adjustably tapped transformer whereby the voltage applied to the unknown impedance may be determined from the setting of the transformer taps and the indication of said indicating means.

10. An impedance measuring electrical bridge for determining the resistive and reactive components of an unknown impedance comprising an alternating voltage supply source, providing first and second output voltages and a reference voltage in known amplitude ratio, first and second controllable potential dividers controlled by first and second control voltages respectively, circuit means for applying the first and second output voltages to said first and second potential dividers to provide outputs from the potential dividers controlled by said control voltages, circuit means combining the outputs of the potential dividers in phase quadrature and feeding the combined outputs to said unknown impedance to provide a first current, a standard impedance, means for applying said reference voltage to said standard impedance to produce a second current, an amplifier into which are fed the first and second currents, two phase sensitive detectors coupled to received the output of said amplifier and controlled in phase quadrature at the frequency of said alternating supply source to give output signals constituting said first and second control voltages, and indicating means for indicating the magnitudes of the outputs of the two potential dividers.

11. An impedance measuring electrical bridge as claimed in claim 10 wherein said alternating voltage supply source comprises an input transformer having a primary winding energised with an alternating current and a plurality of closely coupled secondary windings.

12. An impedance measuring electrical bridge as claimed in claim 10 wherein each of said potential dividers comprises a bi-directional transistor having an emitter, a collector and a base, a fixed resistor connected in series with the collector-to-emitter circuit of the transistor and means for applying the control voltage to the base of the transistor.

13. An impedance measuring electrical bridge as claimed in claim 10 wherein said circuit means combining the outputs of the two potential dividers in phase quadrature comprises two transformers each having a primary winding and a secondary winding, circuit means applying the output of one potential divider to a primary winding on one transformer, means including a phase shifter applying the output of the other potential divider with a relative phase shift of 90° to the primary winding of the other transformer and an output circuit including the secondary windings connected in series with one another and with said unknown impedance.

14. An impedance measuring electrical bridge as claimed in claim 13 wherein the two transformers for combining the potential divider outputs have adjustably tapped secondary windings arranged so that the effective numbers of turns of the two windings in the series circuit may be adjusted.

15. An impedance measuring electrical bridge as claimed in claim 13 wherein said indicating means comprise two separate indicators coupled respectively to the two transformers for separately indicating the two components of the voltage applied to the unknown impedance or voltages in known ratio to these two components.

References Cited by the Examiner

UNITED STATES PATENTS

| 2,762,971 | 9/1956 | Parker | 324—57 |
| 2,900,458 | 8/1959 | Rawdin | 330—108 |
| 3,031,614 | 4/1962 | Calvert | 324—57 |
| 3,079,797 | 3/1963 | Hermanson | 324—61 X |
| 3,117,287 | 1/1964 | Damico | 330—29 |
| 3,139,579 | 6/1964 | Gravel | 324—57 |
| 3,159,787 | 12/1964 | Sexton et al. | 324—99 |

FOREIGN PATENTS

| 664,644 | 1/1952 | Great Britain. |

RUDOLPH V. ROLINEC, *Primary Examiner.*

FREDERICK M. STRADER, WALTER L. CARLSON,
*Examiners.*

E. E. KUBASIEWICZ, *Assistant Examiner*